United States Patent [19]

Tajima et al.

[11] Patent Number: 4,918,346

[45] Date of Patent: Apr. 17, 1990

[54] LOW RIPPLE-TORQUE PERMANENT MAGNET BRUSHLESS MOTOR

[75] Inventors: Fumio Tajima, Jyuou, Japan; Nicolas Samman, Eaubonne, France; Kunio Miyashita; Hiroshi Katayama, both of Hitachi; Motoya Ito, Katsuta; Seiichi Narushima, Tsuchiura; Kiyoshi Yamamuro, Hitachi, all of Japan

[73] Assignee: Hitachi, Ltd., Tokyo, Japan

[21] Appl. No.: 211,042

[22] Filed: Jun. 24, 1988

[30] Foreign Application Priority Data

Jun. 26, 1987 [JP] Japan ................................. 62-157687
Feb. 1, 1988 [JP] Japan ................................... 63-19650

[51] Int. Cl.$^4$ ...................... H02K 21/12; H02K 29/00
[52] U.S. Cl. .................................... 310/156; 310/186; 310/268
[58] Field of Search ............... 310/49 R, 51, 154, 156, 310/186, 266, 268, 42, 187, 261

[56] References Cited

U.S. PATENT DOCUMENTS

| | | | |
|---|---|---|---|
| 4,562,399 | 12/1985 | Fisher | 310/156 |
| 4,631,435 | 12/1986 | McCarty | 310/156 |
| 4,672,253 | 6/1987 | Tajima et al. | 310/156 |

FOREIGN PATENT DOCUMENTS 2206002 12/1988 United Kingdom ................ 310/156

*Primary Examiner*—Patrick R. Salce
*Assistant Examiner*—D. L. Rebsch
*Attorney, Agent, or Firm*—Antonelli, Terry & Wands

[57] ABSTRACT

The stator comprises three phase driving coils and an electric commutator for controlling current to the driving coils. The rotor comprises permanent magnets which are alternately magnetized in N polarity and S polarity. Driving torque is generated corresponding to the current flowing through the driving coils and the permanent magnets. On the surface of the permanent magnet facing to the driving coils, two non-magnetizing portions are provided in each permanent magnet having either N or S polarity.

5 Claims, 4 Drawing Sheets

LOW RIPPLE-TORQUE PERMANENT MAGNET BRUSHLESS MOTOR

FIELD OF THE INVENTION

The present invention relates to a permanent magnet brushless motor, more particularly to a permanent magnet brushless motor having small driving torque ripple.

BACKGROUND OF THE INVENTION

A motor which is used for an acoustic device, such as a motor used for a VCR, is required to have rotational uniformity. It has also been desired to have the torque ripple generated by the motor be small. Concerning torque ripple, there are two kinds of torque ripple, namely cogging torque and a torque ripple which is generated on account of different torque constants depending on different positions of the permanent magnet rotor. The former is prevented from being generated by selection of a coreless motor. Considering the latter, there are two kinds of permanent magnet brushnless motors; one is a sinusoidal drive system transmitting current of 180 degrees per half cycle, and another is a pulsed drive system transmitting current of 120 degrees per half cycle. The former has an advantage of small torque ripple but has a drawback that the mechanism for outputting a sinusoidal signal is complex. At present, the latter is used more often. The pulsed drive system has a drawback in that the torque constant is varied according to the rotational position of the permanent magnet as explained above. An improved pulsed drive system is, for instance, disclosed on page 317, left column, the 4th paragraph of Japanese Patent Laid-Open No. 59-2556 published on Jan. 9, 1984 under the title of "DC motor". This system is characterized in that on an outer peripheral portion of a first disc-shaped permanent magnet, 2 m poles are magnetized at equal angle intervals. A second permanent magnet has an odd number multiple of poles of the first magnet connected at equal intervals. This prior-art system selects the the odd number multiple to be 5 or 7, to reduce the ripple of the driving torque constant. The principle of the prior-art is based on the ripple of the driving torque constant being reduced in such a manner that the torque constant of the 5th or 7th harmonic component is involved effectively to the driving coils.

However, in the prior-art, different permanent magnets having two polarities have to be magnetized into one permanent magnet. For manufacturing the dc motor of the prior-art, it is necessary that two magnetizing processes be carried out. After the first permanent magnets are magnetized, the second permanent magnets have to be magnetized to each permanent magnet. When the second magnets are going to be magnetized to the permanent magnets, a force for removing the magnetization tool is generated so that the second permanent magnets are not magnetized incorrectly, since the polarity of the second permanent magnets is the reverse of the first permanent magnets. For example, suppose that the first and second permanent magnets and the driving coils change the sinusoidal wave shape torque constant which corresponds to the peripheral position of the magnets; the variation of the torque constant is changed to 14% when only the first permanent magnets are magnetized on the outer peripheral of each permanent magnet and the accuracy of fitting the electric commutator is high; on the contrary the variation of the torque constant is changed to 3% when the first and second permanent magnets are magnetized on the outer peripheral of each permanent magnet at the same fitting accuracy of the first permanent magnets mentioned above. According to an experiment in an example in which the first permanent magnets have 8 poles and there are 6 driving coils, the variation of the torque constant becomes 3% when the position of each second permanent magnet is moved by 1 degree of mechanical angle to the pole of each first permanent magnet. On account of this, the characteristic of the motor is greatly changed. At the same time, there is a drawback in that the magnetizing tool of the second permanent magnets has to be accurate, since the area of the second permanent magnets is small and each area greatly affects the variation of the torque constant.

SUMMARY OF THE INVENTION

An object of the present invention is to make the ripple of the drive torque constant small by applying only one magnet of N or S polarity to each permanent magnet without applying two different magnets of N and S polarities to each permanent magnet as was done in the prior art, and to allow the accuracy of the magnetizing tool to be lowered.

The object of the present invention can be attained by disposing two non-magnetizing regions on a peripheral surface of one permanent magnet which faces the driving coil.

By disposing two non-magnetizing regions on the peripheral surface of one permanent magnet facing the driving coil instead of a reverse polarity magnet to one permanent magnet which constitutes a part of the rotor, a permanent magnet brushless motor can be attained which has the same performance of torque constant as the prior art. Also, since the brushless motor of the present invention can execute magnetization of the permanent magnet of the rotor by one process, scattering of the ripple of the torque constant can be reduced. Further, positional accuracy of the magnetization of the permanent magnet can be improved, since the surface area of the non-magnetizing regions on the peripheral surface of each permanent magnet is enlarged compared with the second magnetic poles of the prior-art, as will be apparent from the explanation below.

DETAILED DESCRIPTION OF THE PREFERRED EMBODIMENTS

Figure 2:
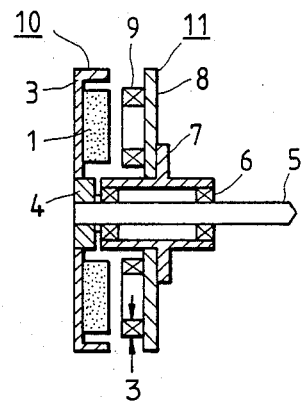
FIG. 2 shows a vertical side view of the brushless motor of one embodiment of the present invention.

Referring to FIG. 2, the permanent magnets 1 in a shape of a disk are fixed to the shaft 5 via the yoke 3 and the boss 4. These elements 1, 3, 4, 5 constitute the permanent magnet rotor 10. The driving coil 9 having a width W, the core 8 and the bracket 7 constitute the stator 11. The permanent magnet rotor 10 is supported rotatively by the stator 11 via the bearing 6.

Figure 1:
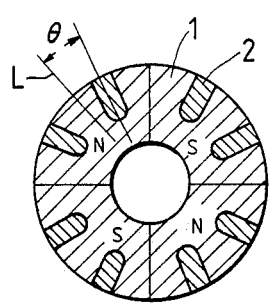
FIG. 1 shows a plain view of a permanent magnet of one embodiment of the present invention.

As disclosed in FIG. 1, the permanent magnets 1 comprise 4 poles. 3 phase coils 9 are constituted by 1 coil per phase. As shown in FIG. 1, one permanent magnet 1 has two non-magnetizing portions 2 within one pole. Each non-magnetizing portion 2 is disposed symmetrically to the center line L of the permanent magnet 1.

Since the magnetizing portion and the non-magnetizing portion are difficult to make with a high degree of accuracy, it is better to make the non-magnetizing portion 2 by notching holes in the non-magnetizing portion 2 on the peripheral surface of the permanent magnet and magnetizing the permanent magnet, or de-magnetizing the non-magnetized portion 2 after the permanent magnet is magnetized. According to the present invention, since the non-magnetizing portion 2 is formed when the permanent magnet 1 is shaped, the non-magnetizing portion 2 can be formed with high accuracy. For instance, when a rare earth magnet having excellent performance is used as the permanent magnet, the manufacturing method of the permanent magnet of the present invention can contribute to save the material of the rare earth magnet.

Figure 3:
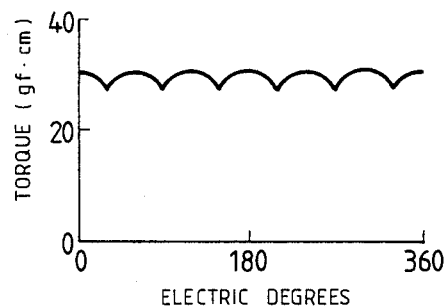
FIG. 3 shows a torque waveform when the non-magnetizing portion is not yet formed on the permanent magnet.
Figure 4:
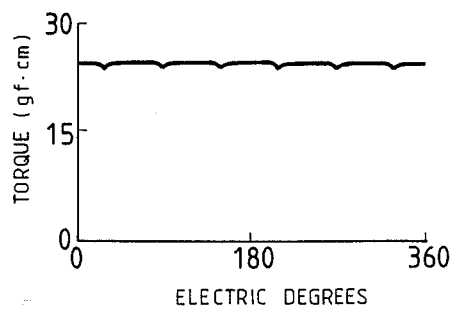
FIG. 4 shows a torque waveform when the non-magnetizing portion is formed on the permanent magnet.

According to FIGS. 3 and 4, it is ascertained by experiment that the permanent magnet brushless motor of the present invention can reduce the variation of the torque constant as well as the prior art.

As will be apparent from the explanation below, the variation of the torque constant becomes large corresponding to the size, the position and the coil width of the non-magnetizing portion 2. The inventors carried out experiments concerning the ratio of the zone area to the magnet area, the relation of the center line of the non-magnetizing portion and the center line of the permanent magnet 1, and the relation between the coil width and the ripple rate. These experiments were carried out by simulation of the calculation of the three dimensional magnetic field distribution and by observation.

Figure 5:
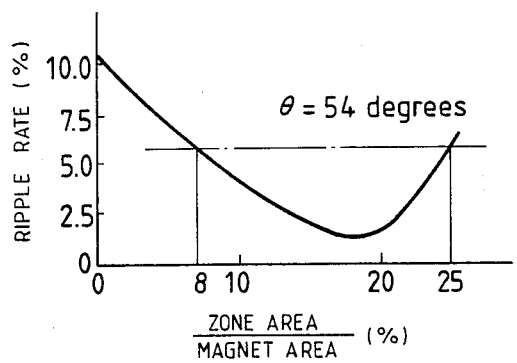
FIG. 5 shows a characteristic between a ratio of the area of the non-magnetizing portion to the area of the permanent magnet or zone area/magnet area and ripple rate.

Referring to FIG. 5, when the area of the non-magnetizing portion or the zone area is increased, the variation of the torque constant or the ripple rate becomes small. When the zone area is approximately 20%, the ripple rate becomes the smallest. After that, when the zone area is increased, the ripple rate is increased. When the ratio of the zone area to the magnet area is 8–25%, the variation of the ripple rate is lower than 5.0%.

Figure 6:
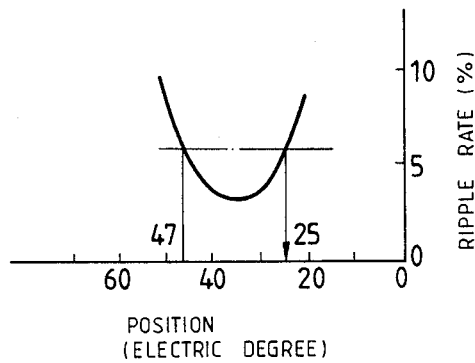
FIG. 6 shows a characteristic between the electric degree from the center line of one permanent magnet and ripple rate.

Referring to FIG. 6, when the position of the non-magnetizing portion 2 from the center line L of the permanent magnet is increased, the ripple rate becomes small. When the position of the electric angle is approximately 36 degrees (the mechanical angle is 18 degrees), the ripple rate is the smallest. After that, when the position of the non-magnetizing portion 2 from the center line L is increased, the ripple rate is increased. When the position from the center line L is 25–47 degrees, the ripple rate is lower than 5%.

Figure 7:
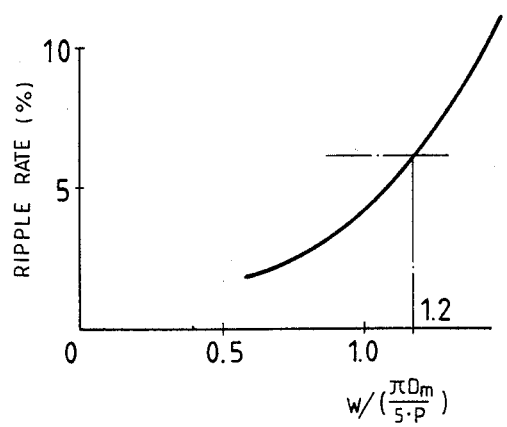
FIG. 7 shows ripple rate corresponding to coil width.

Referring to FIG. 7, the abscissa shows a ratio $$W / \left( \frac{\pi Dm}{5 \cdot P} \right)$$

of the coil width W to the outer peripheral length $\pi Dm$ of the permanent magnet 1 corresponding to the 5th harmonic component, when the diameter of the permanent magnet is Dm and the numbers of poles is P. The ordinate axis is the ripple rate. When $$W / \left( \frac{\pi Dm}{5 \cdot P} \right)$$

is lower then 1.2, the ripple rate is lower than 5.0%.

Figure 8:
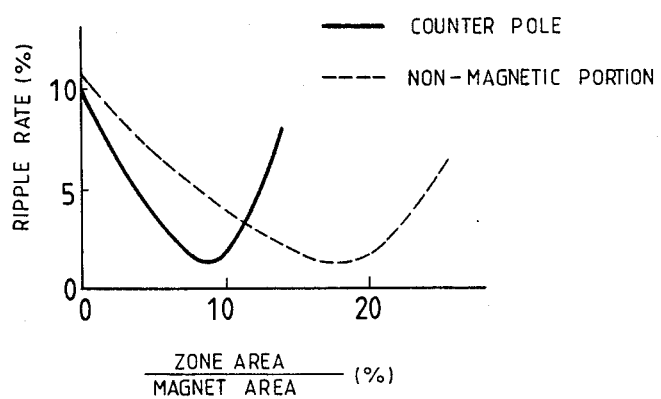
FIG. 8 shows characteristic between the ratio of zone area to magnet area and ripple rate concerning the non-magnetizing portion of the present invention and the counter pole of the prior art.

In FIG. 8, the solid line shows the characteristic curve of the prior art in which the counter pole is used, and the dotted line shows the characteristic curve of the present invention in which the non-magnetizing portion is made in the permanent magnet. FIG. 8 discloses that the area of the non-magnetizing portion necessitates two time the area of the counter pole of the prior art. Accordingly, the dimensional accuracy of the non-magnetizing portion can be lowered.

According to the embodiment explained above, the permanent magnet of the present invention can be magnetized by only one magnetization, even if the dimensional tolerance of the non-magnetizing portion of the permanent magnet is comparatively low, and the permanent magnet brushless motor having small torque ripple can be provided.

Hereunder, we will explain the preferred configuration of the non-magnetizing portion of the permanent magnet.

When a high performance magnet such as SmCo (samarium cobalt) is used, the cost of the material thereof can be reduced by shaping the non-magnetizing portion in a cutting configuration from the outer peripheral portion of the permanent magnet of the rotor. In this case, it is most profitable to make the non-magnetizing portion by molding from the beginning. Since the high performance magnet has to be pressed at a high pressure to form the recesses of the non-magnetizing portion, it has the drawback that a strong tool is demanded, depending on the shape of the non-magnetizing portion. When the press pressure can not be increased, the magnetic characteristic in the periphery of the non-magnetizing portion can not be expected so that the motor characteristics can not be increased sufficiently.

According to the embodiment of the present invention, the permanent magnet brushless motor can be provided in such a manner than the torque ripple is reduced and the manufacturing of the permanent magnet is easy, maintaining the magnetic characteristic of the permanent magnet.

According to the present invention, the width of the non-magnetizing portion is made to spread wide toward the outer peripheral portion from the inner peripheral portion of the permanent magnet. For instance, the cross section of the non-magnetizing portion is formed in a trapezoidal or semicircular fashion.

Since the non-magnetizing portion is made wide toward the outer peripheral portion from the inner peripheral portion of the permanent magnet, the die for making the recesses of the non-magnetizing portion can endure the pressing force of making the permanent magnet and reduce the cost thereof. Accordingly, the motor can be made having low torque ripple and high performance.

Figure 9:
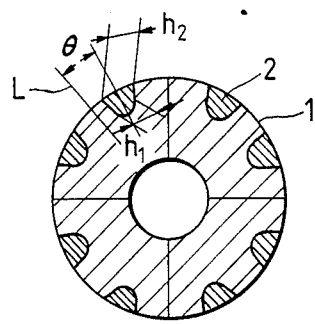
FIG. 9 shows a plain view of a permanent magnet of another embodiment of the present invention.

Referring to FIG. 9, the non-magnetizing portion 2 is formed by cutting from the outer peripheral portion of the permanent magnet. Namely, the non-magnetizing portion is made in such a manner that $h_2 > h_1$, where the width of the inner peripheral portion of the non-magnetizing portion is $h_1$ and the width of the outer peripheral portion thereof is $h_2$. By forming the non-magnetizing portion as explained above, the cost of the material of the permanent magnet can be reduced when the high performance magnet is used, and the weight of the motor can be reduced. The shape of the non-magnetizing portion can be made with high accuracy by pressing.

The high performance magnet, especially SmCo magnet, is made by the process of pressurizing and packing the powder of the material of the permanent magnet. The higher the performance the permanent magnet is to have, the greater the pressurizing force applied to the powder material of the permanent magnet is demanded when the permanent magnet is produced. When the non-magnetizing portion is formed as explained above, the stress applied to the manufacturing tool is reduced, compared with that of a non-magnetizing portion in which the shape thereof is in an acute angle. According to the present invention, uniform pressuring force is applied to the permanent magnet in the periphery of the non-magnetizing portion, and the performance of the permanent magnet is not lowered.

Figure 10:
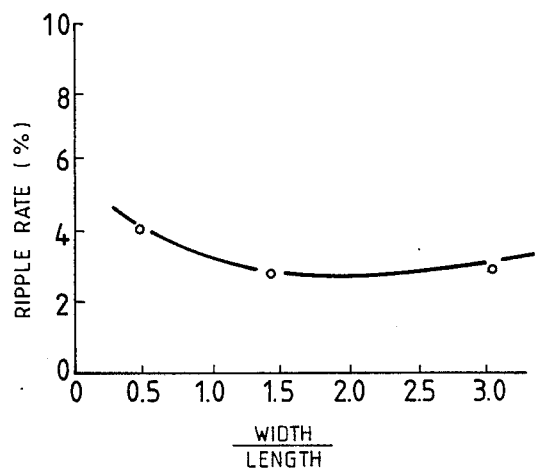
FIG. 10 shows a characteristic of ripple rate corresponding to the ratio of the width of the non-magnetizing portion to the length of the non-magnetizing portion when the sectional area of the non-magnetizing portion is constant.

Referring to FIG. 10, when the ratio of the width of the non-magnetizing portion to the length thereof is approximately 0.5–3.5, approximately constant ripple rate can be obtained.

Figure 11:
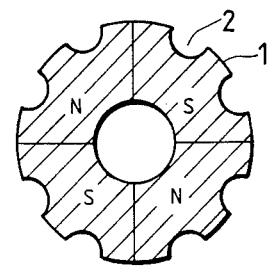
FIG. 11 shows a plain view of a permanent magnet of other embodiment of the present invention.

Referring to FIG. 11, the non-magnetizing portion 2 is formed in a semicircle. When the semicircle is applied to the non-magnetizing portion, the pressure applied to the die blade of the non-magnetizing portion at the permanent magnet is reduced in the compressing formation of the permanent magnet. Since the compressing force can be applied sufficiently to the inner peripheral portion of the non-magnetizing portion, the desired performance can be maintained at the permanent magnet.

What we claim is:

1. A permanent magnet brushless motor comprising permanent magnets which are magnetized in N polarity and S polarity alternately in equal intervals, three phase driving coils facing the permanent magnets, electric commutators for controlling current to the driving coils, wherein a driving torque is generated corresponding to the current flowing through the driving coils and the permanent magnet, characterized in that two non-magnetizing regions are disposed on a surface of each permanent magnet having one polarity and facing said driving coils.

2. A permanent magnet brushless motor according to claim 1, wherein said permanent mgnet is in a shape of a disk, and said non-magnetizing portion is a slot extending from an outer peripheral portion of the disk.

3. A permanent magnet brushless motor according to claim 1, wherein said non-magnetizing portion is wider toward an outer peripheral portion from an inner peripheral portion of said permanent magnet.

4. A permanent magnet brushless motor according to claim 1, wherein said permanent magnet is in a shape of a disk, and when a diameter of said permanent magnet is $D_m$, a width of said driving coil is W, and pole numbers are P, the coil width W is selected to be $$W / \left( \frac{\pi D_m}{5 \cdot P} \right) < 1.2.$$

5. A permanent magnet according to claim 1, wherein, when an area of said non-magnetizing portion is Am, and an area of said permanent magnet is Sm, said permanent magnet and said non-magnetizing portion are formed to be $0.08 < Am/Sm < 0.25$.

* * * * *